United States Patent [19]

Otsuki

[11] Patent Number: 4,870,595
[45] Date of Patent: Sep. 26, 1989

[54] NUMERICAL CONTROL EQUIPMENT
[75] Inventor: Toshiaki Otsuki, Hino, Japan
[73] Assignee: Fanuc Ltd, Minamitsuru, Japan
[21] Appl. No.: 256,111
[22] Filed: Oct. 11, 1988

Related U.S. Application Data

[63] Continuation of Ser. No. 45,058, Mar. 23, 1987, abandoned.

[30] Foreign Application Priority Data

Jul. 25, 1985 [JP] Japan ................... 60-167827

[51] Int. Cl.$^4$ ........................... G06F 9/22; G06F 3/00
[52] U.S. Cl. ...................... 364/474.23; 364/200;
364/263.1; 364/239.3; 364/254.3
[58] Field of Search ............ 364/474.23, 200 MS File,
364/900 MS File

[56] References Cited

U.S. PATENT DOCUMENTS

| | | | |
|---|---|---|---|
| 3,274,378 | 9/1966 | Crawford et al. | 340/347 DD |
| 3,478,322 | 11/1969 | Evans | 364/200 |
| 3,573,854 | 4/1971 | Watson et al. | 364/200 |
| 4,068,297 | 1/1978 | Komiya | 364/474.23 |
| 4,200,927 | 4/1980 | Hughes et al. | 364/200 |
| 4,209,847 | 6/1980 | Noda et al. | 364/167 X |
| 4,243,923 | 1/1981 | Whitney et al. | 364/167 |
| 4,298,927 | 11/1981 | Berglund et al. | 364/200 |
| 4,433,327 | 2/1984 | Vallet et al. | 340/347 DD |
| 4,484,286 | 11/1984 | Nagamine et al. | 364/474 |
| 4,511,985 | 4/1985 | Inaba et al. | 364/191 X |
| 4,534,001 | 8/1985 | Nozawa et al. | 364/474 |
| 4,550,378 | 10/1985 | Nozawa et al. | 364/474 |
| 4,585,377 | 4/1986 | Nozawa et al. | 364/474 X |
| 4,591,968 | 5/1986 | Nozawa et al. | 364/167 |
| 4,616,337 | 10/1986 | Sheth | 364/900 |
| 4,680,697 | 7/1987 | Kiya et al. | 364/191 |

OTHER PUBLICATIONS

"Asynchronous Pipelined Instruction Prefetch Mechanism," Veniski et al., IBM TDB, vol. 25, No. 9, 2/83, pp. 4722–4727.

Primary Examiner—John R. Lastova
Attorney, Agent, or Firm—Staas & Halsey

[57] ABSTRACT

Data accommodated in a plurality of successive blocks specified by a registration command is converted into an execute form and prestored in storage means. In response to an execution command, control is performed in accordance with the stored data. In the case of executing in succession a plurality of blocks each having a short execution time, data in the blocks is converted into the execute form and stored. This eliminates the time for the data conversion, and hence permits continuous movement of a movable machine part.

1 Claim, 4 Drawing Sheets

FLOWCHART SHOWING PART OF THE CONTENTS
OF PROCESSING BY MICROPROCESSOR 11

DIAGRAM OF THE CONSTITUTION OF THE PRESENT INVENTION

BLOCK DIAGRAM OF AN EMBODIMENT OF THE PRESENT INVENTION

FLOWCHART SHOWING PART OF THE CONTENTS
OF PROCESSING BY MICROPROCESSOR 11

FLOWCHART SHOWING PART OF THE CONTENTS OF PROCESSING BY MICROPROCESSOR 21

DIAGRAM OF THE ARRANGEMENT OF RAM 18

NUMERICAL CONTROL EQUIPMENT

This is a continuation of co-pending application Ser. No. 045,058 filed on 3/23/87, now abandoned.

BACKGROUND OF THE INVENTION

The present invention relates to improvement in or relating to numerical control equipment, and more particularly to numerical control equipment which enables a movable machine part to continuously move even in the case of executing in succession a plurality of blocks having a short execution time.

Conventional numerical control equipment is arranged so that, upon each readout of one block of command information, it converts data accommodated in the block into an execute form and then controls the operation of a movable machine part in accordance with the converted data. This conversion is to change the data held in the block into a form for easy processing in the numerical control equipment; for example, data given in the form of a decimal number is transcribed into a hexadecimal number.

However, according to an arrangement in which the above-mentioned processing is performed upon each readout of one block of command information and processing of the next block is not initiated until processing of the current block is completed, the movable machine part will be at a standstill until data in an execute form is produced. Such a stoppage of the movable machine part between adjacent blocks will not only impair the cutting efficiency but also pose the problems that the workpiece is stained with a cutter mark and subject to vibration.

To avoid this, the prior art numerical control equipment employs first and second buffers for storing data converted into an execute form. While processing corresponding to the preceding block (N−1) is being performed on the basis of data stored in one buffer (the first buffer, for example), data held in the current block (N) is converted into the execute form and then stored in the second buffer (the second buffer). Upon completion of the processing corresponding to the preceding block (N−1), processing corresponding to the current block (N) is performed according to the data stored in the other buffer, and at the same time, data held in the next block (N+1) is converted into the execute form and then stored in the one buffer.

Such a conversion of data accommodated in the next block into the execute form during the execution of the process corresponding to the current block will settle the above-noted problems to some extent. In the case of successive executing a plurality of blocks of short execution times, the movable machine part may still sometimes come to a halt between the blocks. That is, when the blocks have short execution times, there are cases where even after completion of the process corresponding to the current block the data in the next block has not yet been converted into the execute form. Also in such a case, the movable machine part will stop between the blocks, similarly presenting the problems that the workpiece will be stained with a cutter mark and subject to vibration.

The present invention offers a solution to the above-mentioned problems and has for its object to prevent the movable machine part from stopping even when a plurality of blocks having short execution times are executed in succession.

SUMMARY OF THE INVENTION

To attain the above object, according to the present invention, numerical control equipment which, upon each readout of one block of command information, converts data accommodated in the block into an execute form and effects control based on the converted data, is provided with conversion means 2 whereby data held in a plurality of successive blocks specified by a registration command is converted into the execute form and stored in storage means 1 and control means 3 which is responsive to an execution command to perform control in accordance with the data stored in the storage means 1.

In the case where a plurality of blocks of short execution times are to be executed, data accommodated in the blocks is preconverted into the execute form and prestored in the storage means 1. This will eliminate the time which would otherwise be consumed for the data conversion, and hence permits continuous movement of the movable machine part.

DESCRIPTION OF THE PREFERRED EMBODIMENT

Figure 1:
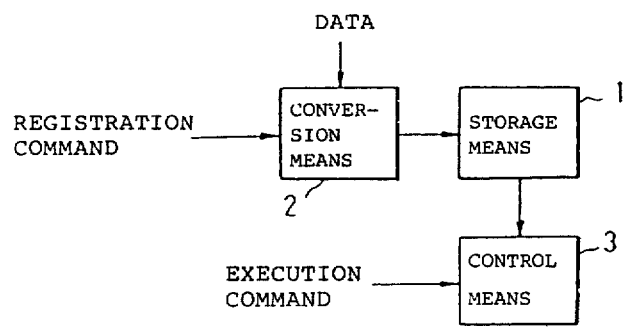
FIG. 1 is a diagram showing the constitution of the present invention.
Figure 2:
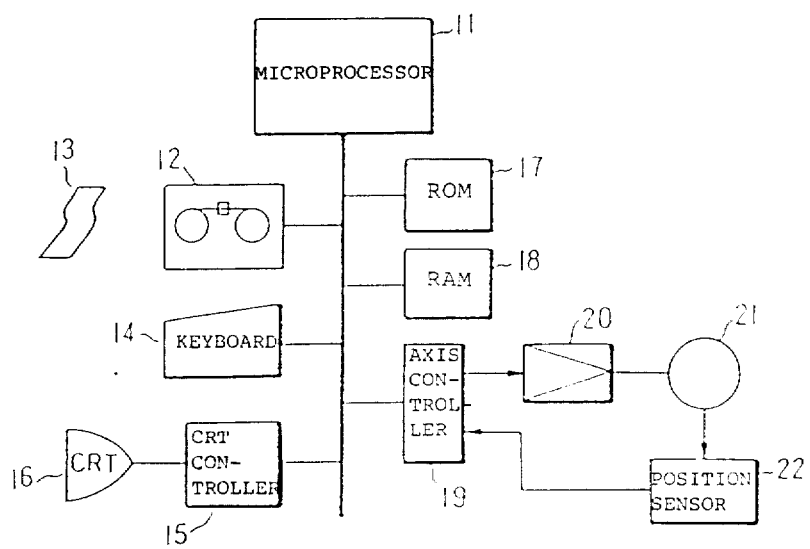
FIG. 2 is a block diagram illustrating an embodiment of the present invention.
Figure 3:
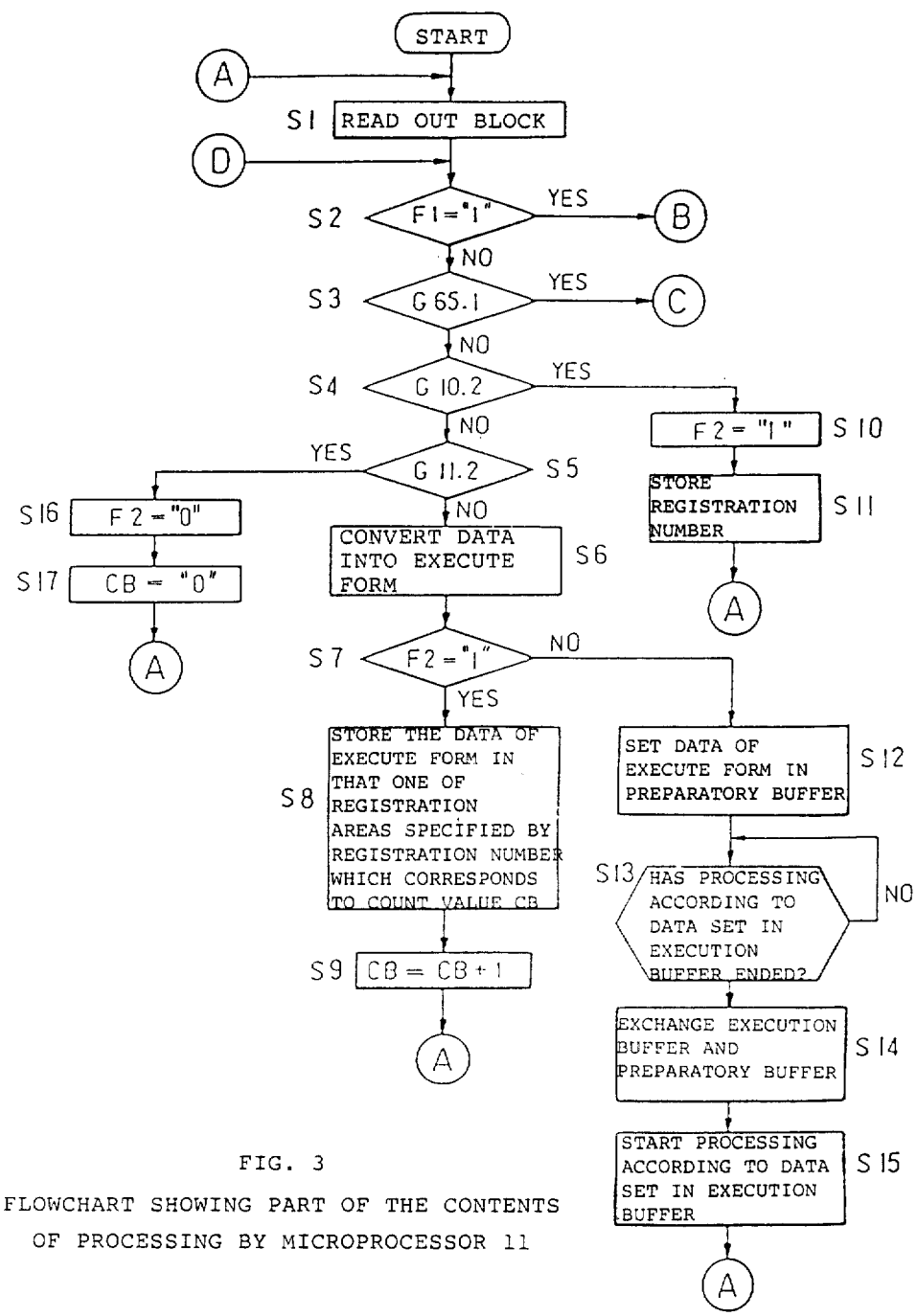
FIGS. 3 and 4 are flowcharts showing the contents of processing by a microprocessor 21.
Figure 4:
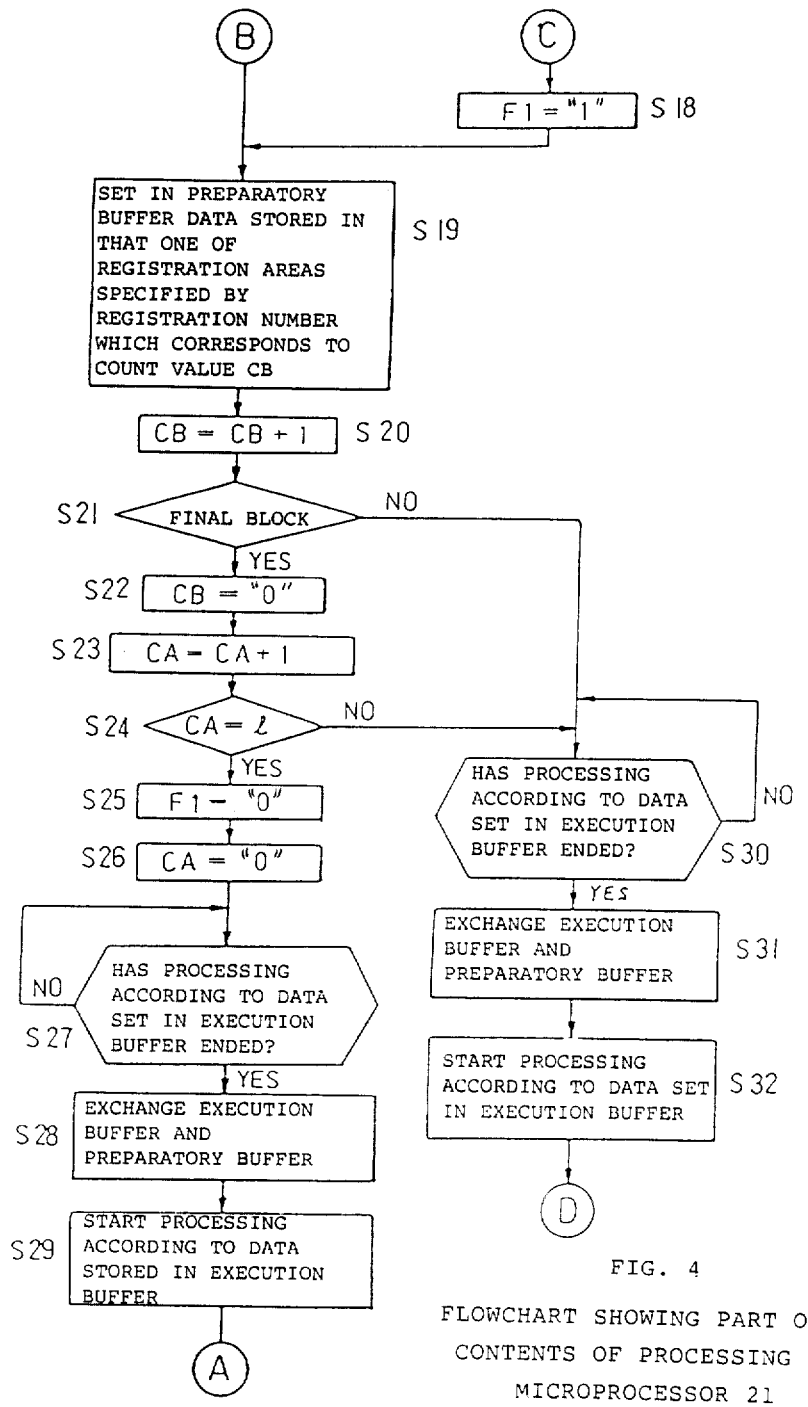

FIG. 2 illustrates in block form an embodiment of the present invention. Reference numeral 11 indicates a microprocessor, 12 a tage reader, 13 a command tape, 14 a keyboard, 15 a CRT controller, 16 a CRT, 17 an ROM, 18 an RAM, 19 an axis controller, 20 a servo amplifier, 21 a motor, and 22 a position sensor. FIGS. 3 and 4 are flowcharts showing a part of the contents of processing by the microprocessor 11.

A brief description will be given first of the point of this embodiment. In this embodiment, G codes G10.2, G11.2 and G65.1 are newly defined, data accommodated in a block between blocks containing the codes G10.2 and G11.2, respectively, is preconverted into an execute form and stored in a predetermined area of the RAM 18. By reading out the block containing the code G65.1, processing takes place in accordance with the data stored in the above predetermined area of the RAM 18. For instance, when command information is such as mentioned below, data accommodated in blocks (2) to (6) between blocks (1) and (7) containing the codes G10.2 and G11.2, respectively, is converted into the execute form and then stored in a predetermined area of the RAM 18. By reading out a block (8) containing the code G65.1, processing is performed corresponding to the data stored in the above predetermined area of the RAM 18.

| | | | |
|---|---|---|---|
| G10.2 | $P_p$; | | (1) |
| G01 | X10 | Y0; | (2) |
| G01 | X11 | Y11; | (3) |
| G01 | X0 | Y10; | (4) |
| G01 | X11 | Y0; | (5) |
| G01 | X10 | Y10; | (6) |
| G11.2; | | | (7) |

| -continued | | | |
|---|---|---|---|
| G65.1 | P_p | Ll: | (8) |

In the above, the numerical value p next to P in the block (1) containing the code G10.2 is a registration number specifying the area of the RAM 18 where in which the data converted into an execute form is to be stored, the numerical value p next to P in the block (8) containing the code G65.1 is a registration number specifying the area of the RAM 18 from which the stored data is to be read out for processing, and the numerical value l next to L specifies the number of repetitions (a numerical value specifying how many times processing is to be repeated corresponding to the data stored in the area specified by the registration number p.) In the following description, the block containing the code G10.2, the block containing the code G11.2, and the block containing the code G65.1 will be referred to as a registration start block, a registration end block, and an execution start block, respectively.

A description will be given, with reference to FIGS. 3 and 4, the operation of the embodiment depicted in FIG. 2.

Having read out through the tape reader 12 one block of command information recorded on the command tape (step S1), the microprocessor 11 decides whether an execution flag F1 is "1" (step S2). As described later, when the execution start block containing the code G65.1 is read out, that is, when processing is initiated which is based on the data preconverted into the execute form and stored in a predetermined area of the RAM 18, the execution flag F1 is "1" in step S18 and when the processing has been performed by the number of times specified by the numerical value l, the flag is "0" in step S25.

Where the result of decision is step S2 is "NO", the microprocessor 11 decides whether the G code contained in the block read out in step S1 is G65.1, G10.2, or G11.2 (steps S3 to 5).

When having decided that the G code in the read-out block is G10.2, that is, when having decided that it is commanded that data accommodated in a plurality of blocks following the registration start block be converted into the execute form and stored in a predetermined area of the RAM 18 (step S4), the microprocessor "1" a registration flag F2 (step S10) and then stores the registration number p contained in the registration start block (step S11), thereafter returning to step S1 for reading out the next block. Since the block succeeding the registration start block containing the code G10.2 contains a G code except those G10.2, G11.2 and G65.1 as seen from the above, the decision results in steps S2 through S5 are all "NO" when the microprocessor has read out the block subsequent to the registration start block. Accordingly, when having read out this block, the microprocessor 11 first converts data accommodated in the read-out block (step S6) and then decides whether the registration flag F2 is "1" (step S7). Since the registration flag F2 is "1" upon readout of the registration start block as mentioned previously and is "0" upon readout of the registration end block containing the G code G11.2 as described later, the result of decision in step S7 is "YES" in this case. In consequence, the data converted into the execute form in step S6 is stored in that one of registration areas of the RAM 18 specified by the registration number p which corresponds to a count value CB (step S8). After this, the microprocessor 11 increments by one the count value CB of a counter B provided in the form of software in the microprocessor itself (step S9) and then it goes back to step S1. Thereafter, the microprocessor 11 repeats the processing in steps S1 to S9 until it reads out the registration end block containing the G code G11.2, whereby pieces of data accommodated in blocks between the registration start block and the registration end block and converted into the execute form are sequentially stored in predetermined areas of the RAM 18. Then, when having read out the registration end block containing the G code G11.2 (step S5), the microprocessor 11 "0" the registration flag F2 (step S16) and decrements the count value CB of the counter B to "0" (step S17), thereafter returning to step S1.

Figure 5:
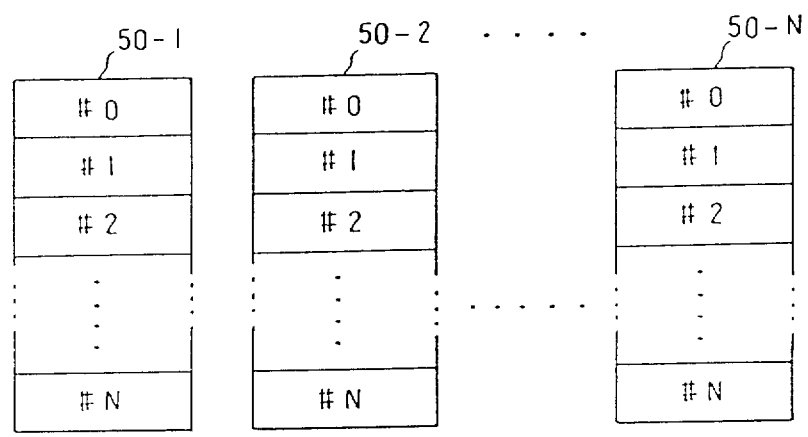
FIG. 5 is a diagram showing the arrangement of a RAM 18.

The RAM 18 has, as shown in FIG. 5, a plurality of registration areas 50-1 to 50-N, each including subareas #1 to #N. With reference to FIG. 5, the processing in step S8 will be described concretely. Assume that the registration areas 50-1 to 50-N correspond to registration numbers 1 to N, respectively. Now, assuming that the registration number held in the read-out registration start block (n) is "1", the microprocessor 11 repeats, until it has read out the registration end block, a process by which data converted into the execute form from data in a block (n+1) following the registration start block (n) is stored in the subarea #0 of the registration area 50-1, data converted into the execute form from data in the next block (n+2) is stored in the subarea #1, and data converted into the execute form from data in a block (n+CB) is stored in a subarea #CB.

In the case where the G code in the read-out block is not any one of those G10.2, G11.2 and G65.1 (i.e. the decision results in steps S3 to S5 are all "NO") and the registration flag F2 is "down" at that time (i.e. when the decision result in step S7 is "NO"), the microprocessor 11 converts the data accommodated in the read-out block into the execute form (step S12) and decides whether processing corresponding to data set in an execution buffer has been completed or not (step S13). When the result of decision in step S13 is "YES", the microprocessor 11 exchanges a preparatory buffer and the execution buffer (step S14) and starts processing based on the data set in the execution buffer (step S15). The preparatory and execution buffers herein mentioned correspond to the first and second buffers used in the prior art example. That is, in the case where the G code in the read-out block is none of those G10.2, G11.2 and G65.1 and the block is not interposed between the registration start block and the registration end block, the same processing as in the prior art takes place.

Where the block read out in step S1 is the execution start block containing the G code G65.1 (i.e. where the result of decision in step S3 is "YES"), the microprocessor 11 "1" the execution flag F1 (step S18). Then, the microprocessor sets in the preparatory buffer the data stored in the subarea #CB (the subarea #0 in this example) of the registration area 50-p corresponding to the registration number p contained in the execution start block, the subarea corresponding to the count value CB (step S19), increments the count value CB of the counter B by one (step S20), and decides whether the data set in the preparatory buffer in step S19 is data corresponding to the last one of the blocks stored in the registration area (step S21).

When the result of decision in step S21 is "NO", the microprocessor 11 decides whether processing based on the data set in the execution buffer provided in the microprocessor has been finished or not (step S30). When the result of decision in step S30 is "YES", the microprocessor 11 exchanges the preparatory buffer and the execution buffer (step S31), starts processing based on the data set in the execution buffer (step S32), and then returns to step S2.

Where the result of decision in step S21 is "YES", the microprocessor 11 decrements the count value CB of the counter B to "0" (step S22), increments by one the count value CA of a counter A provided in the form of software in the microprocessor (step S23), and decides whether the count value CA of the counter A has become equal to the number of repetions l specified by the execution start block (step S24). When the result of decision in step S24 is "NO", the microprocessor proceeds to step S30, and when the result of decision is "YES", it "0" the execution flag F1 (step S25), decrements the count value CA of the counter A to "0"(step S26), and then decides whether the processing based on the data set in the execution buffer has been completed (step S27). When the result of decision in step S27 is "YES", the microprocessor 11 exchanges the preparatory buffer and the execution buffer (step S28), starts processing based on the data set in the execution buffer (step S29), and the returns to step S1 for reading out the next block).

As described above, the numerical controller of the present invention is provided with conversion means by which data accommodated in a plurality of successive blocks specified by a registration command (G10.2, G11.2 in the embodiment) is converted into an execute form and the converted data is stored in storage means such as the RAM 18, and control means responsive to an execution command (G65.1 in the embodiment) to effect control based on the data stored in the storage means. With such an arrangement, even in the case of executing in succession a plurality of blocks of short execution times, the movable machine part will not come to a standstill between adjacent blocks. This increases the cutting speed and prevents a workpiece from being stained with a cutter mark.

What is claimed is:

1. Numerical control system for controlling a movable machine in accordance with a numerical control (NC) program including command data, said system comprising:

means for reading blocks of command data including a registration start block having a registration number, a registration end block and an execution start block having a registration number;

converting means for converting, while controlling the movable machine, a plurality of blocks of the command data into execute form data in response to the registration start block and the registration end block;

storage means, having a plurality of registration areas, for storing the execute form data in a registration area specified by the registration number of said registration start block; and control means for controlling the movable machine in accordance with execute form data stored in one of said registration areas specified by a registration number of an execution start block.

* * * * *